(12) United States Patent
Aila et al.

(10) Patent No.: US 8,478,071 B2
(45) Date of Patent: Jul. 2, 2013

(54) SYSTEM AND METHOD FOR CONSTRUCTING A MOTION-COMPENSATED COMPOSITE IMAGE

(75) Inventors: Timo Aila, Helsinki (FI); Samuli Laine, Helsinki (FI)

(73) Assignee: NVIDIA Corporation, Santa Clara, CA (US)

( * ) Notice: Subject to any disclaimer, the term of this patent is extended or adjusted under 35 U.S.C. 154(b) by 787 days.

(21) Appl. No.: 12/639,382

(22) Filed: Dec. 16, 2009

(65) Prior Publication Data

US 2011/0142369 A1 Jun. 16, 2011

(51) Int. Cl.
| | |
|---|---|
| G06K 9/36 | (2006.01) |
| G06K 9/00 | (2006.01) |
| G06K 9/46 | (2006.01) |
| H04N 5/228 | (2006.01) |
| H04N 3/16 | (2006.01) |
| H04N 5/257 | (2006.01) |
| H04N 11/20 | (2006.01) |
| H04N 7/01 | (2006.01) |

(52) U.S. Cl.
USPC ........... 382/284; 382/103; 382/107; 382/236; 348/208.4; 348/208.99; 348/452

(58) Field of Classification Search
None
See application file for complete search history.

(56) References Cited

U.S. PATENT DOCUMENTS

| | | | | |
|---|---|---|---|---|
| 7,796,872 B2 * | 9/2010 | Sachs et al. | | 396/55 |
| 7,956,897 B2 * | 6/2011 | Hatanaka et al. | | 348/208.4 |
| 8,208,746 B2 * | 6/2012 | Albu et al. | | 382/255 |
| 2004/0066460 A1 * | 4/2004 | Kondo et al. | | 348/222.1 |
| 2004/0239775 A1 * | 12/2004 | Washisu | | 348/239 |
| 2005/0018927 A1 * | 1/2005 | Manabe | | 382/294 |
| 2005/0047672 A1 * | 3/2005 | Ben-Ezra et al. | | 382/255 |
| 2006/0039690 A1 * | 2/2006 | Steinberg et al. | | 396/155 |
| 2006/0098891 A1 * | 5/2006 | Steinberg et al. | | 382/255 |
| 2006/0125938 A1 * | 6/2006 | Ben-Ezra et al. | | 348/241 |
| 2007/0014554 A1 * | 1/2007 | Sasaki et al. | | 396/55 |
| 2008/0101786 A1 * | 5/2008 | Pozniansky et al. | | 396/159 |
| 2008/0166115 A1 * | 7/2008 | Sachs et al. | | 396/55 |
| 2009/0102935 A1 * | 4/2009 | Hung et al. | | 348/222.1 |
| 2009/0207259 A1 * | 8/2009 | Ito et al. | | 348/208.4 |
| 2009/0231447 A1 * | 9/2009 | Paik et al. | | 348/208.4 |
| 2009/0245685 A1 * | 10/2009 | Makii | | 382/276 |
| 2009/0251550 A1 * | 10/2009 | Nakamura et al. | | 348/208.4 |
| 2011/0115928 A1 * | 5/2011 | Corcoran et al. | | 348/208.2 |
| 2012/0086833 A1 * | 4/2012 | Taira et al. | | 348/231.99 |
| 2012/0148224 A1 * | 6/2012 | Pozniansky et al. | | 396/153 |

OTHER PUBLICATIONS

"Synthetic Shutter Speed Imaging," J. Telleen, A Sullivan, A. Yee, O. Wang, P. Gunawardane, J. Davis, Proc. Eurographics 2007.
"Time-constrained Photography," S. Hasinoff, K. Kutulakos, F. Durand, W. Freeman, Proc. 12th IEEE International Conference on Computer Vision, ICCV 2009.

* cited by examiner

Primary Examiner — Randolph I Chu
(74) Attorney, Agent, or Firm — Zilka-Kotab, PC (57) ABSTRACT

A method for constructing a motion-compensated composite image of a scene includes acquiring a plurality of images of a scene over time, the plurality of images including an earlier-acquired image of the scene and a later-acquired image scene. The relative motion between the earlier and later acquired images are estimated, and an exposure parameter is computed based upon the estimated relative motion occurring between the earlier and later acquired images. A new image of the scene is acquired using the computed exposure parameter, and the earlier, later, and newly acquired images are combined to produce a motion-compensated composite image of the scene.

22 Claims, 4 Drawing Sheets

SYSTEM AND METHOD FOR CONSTRUCTING A MOTION-COMPENSATED COMPOSITE IMAGE

BACKGROUND

The present invention relates to an imaging system and method, and more particular to a system and method for constructing motion-compensated composite images.

Imaging systems, such as cameras and the like, are often vulnerable to producing blurred images due to relative movement between the imaging system and the scene which is to be acquired. Installing the imaging system upon a tripod is one way to avoid this type of degradation, although such an installation process is typically inconvenient for the user to employ.

J. Telleen et al. in "Synthetic Shutter Speed Imaging" Proc. Eurographics 2007 discloses a technique for compensating the motion of an image using layer decomposition, in which multiple images of the scene are acquired over time, each image being motion-compensated relative to a subsequently acquired image, and the images composited to form a motion-compensated image of the scene.

The number of images employed in such a technique can be set to any number, and thus it is important to employ a sufficient number to compensate for motion on the one hand, while on the other hand implementing as few images as possible so as to achieve a high signal-to-noise ratio (SNR) for the composite image. Specifically, if the total exposure time for the composite image is defined as E, and the total number of images is N, each image will have an exposure time of E/N. As the number of number of images N increases, noise contributions to each image will degrade that image's SNR, resulting in an overall SNR degradation of the final composite image, such degradation being visible as fuzziness and increased noise in the composite image. However, a large number of images may be necessary in order to provide greater motion compensation correction, e.g., when the relative motion between the imaging system and the scene is large.

What is therefore needed is a technique for constructing a motion-compensated composite image which employs an optimal number of images.

SUMMARY

The present invention provides a system and method for constructing a motion-compensated composite image, in which the number of images contributing to the composite image can be made to vary dynamically depending upon the estimated motion between images. In this manner, the system and method can be used to generate fewer images for composite image construction under low motion conditions in order to provide higher composite image SNR, thereby providing greater image clarity and resolution. The system and method are also adaptable to provide an increased number of images when necessary to compensate for a large degree of motion sensed between images to reduce blurring effects in the composite image.

In an exemplary embodiment, a method for constructing a motion-compensated composite image of a scene includes acquiring a plurality of images of the scene over time, the plurality of images including an earlier acquired image of the scene and a later acquired image of the scene. The relative motion between the earlier and later-acquired images is estimated, and an exposure parameter value computed based upon the estimated relative motion. A new image of the scene is acquired using the computed exposure parameter value. The earlier acquired, later acquired and new images of the scene are combined to produce a motion-compensated composite image of the scene.

These and other features of the invention will be better understood in view of the following drawings and detailed description of exemplary embodiments.

BRIEF DESCRIPTION OF THE DRAWINGS

For clarity, previously-identified features retain their reference indices in subsequent drawings.

DETAILED DESCRIPTION OF EXEMPLARY EMBODIMENTS

Figure 1:
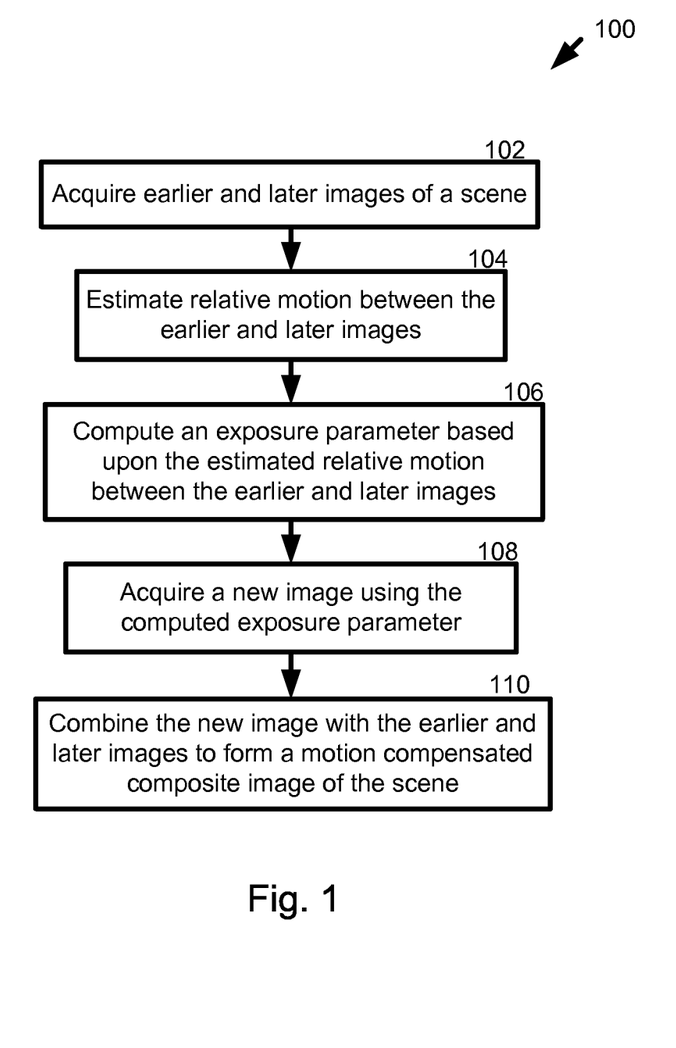
FIG. 1 illustrates an exemplary method for constructing a motion-compensated composite image of a scene in accordance with the present invention.

FIG. 1 illustrates an exemplary method for constructing a motion-compensated composite image of a scene in accordance with the present invention. At 102, a plurality of images of a scene is acquired over time, the plurality of images including an earlier acquired image of the scene and a later acquired image of the scene. At 104, the relative motion between the earlier and later acquired images is estimated. At 106, an exposure parameter value is computed based upon the relative motion estimated between the earlier and later acquired images. At 108, a new image of the scene is acquired using the computed exposure parameter. At 110, the earlier acquired, later acquired and new images of the scene are composited (i.e., combined) to produce a motion-compensated composite image of the scene.

Referring to operation 102, the terms "earlier acquired image," "later acquired image," and "new image" refers to the relative chronology as to the acquisition of these images, i.e., that the earlier acquired image ("earlier image" for brevity) is acquired at some point in time before the later acquired image ("later image" for brevity), and that the later image is acquired at some point in time before the new image. For example, the earlier, later, and new images may be immediately consecutive, for example, the $i^{th}$, $j^{th}$ and $k^{th}$ images. In another embodiment, one or more intervening images may occur between any two of the earlier, later and new images, e.g., the earlier image may be the $i^{th}$ image, the later image may be the $k^{th}$, and the new image may be the $n^{th}$ image. The number of intervening images between the earlier and later images versus the later and new images may be different.

Further particularly, the term "scene" refers to a sub-portion of a larger image "field", the scene being a portion of the image field which is retained in all acquired images. Because motion occurs between subsequently-acquired images, the entire field of the image (e.g., bordering pixels) may not be retained in different images, i.e., the borders (outlying pixels) of one image field will differ from the borders of an image field subsequently acquired. Notwithstanding this, some portion of the field is retained in each of the acquired images, and the portion (e.g., pixel area) which is commonly-retained across all acquired images is referred to as the "scene," as referred to hereinafter. The scene may be defined in terms of a number of pixels or a pixel array which will contribute to the motion-compensated composite image.

In one embodiment, the scene includes substantially all portions of the commonly-retained portion/area of the scene. In another embodiment, the scene upon which the method operates is defined for a small portion/area of the available scene area to thereby render that small portion/area substantially motionless. This latter embodiment can be used to provide an effect of motion tracking of a particular area or object included therein, as will be further described below. One, several, or all images may be acquired using a plurality of different means, for example, by means of a camera or other image capturing equipment. In another embodiment, the images may be captured using time-of-flight cameras, radar, sonar, lidar imaging or other imaging systems and applications.

Further exemplary of operation 102, the exposure parameter may be any exposure-related feature, e.g., an exposure time/shutter duration, relative aperture/f-number, ISO sensitivity, amplifier gain, or other exposure-related parameters. The values of these parameters may be any arbitrary number consistent with the parameter, e.g., in the exemplary embodiment in which the exposure parameter is exposure duration, the exposure parameter values may range from $\frac{1}{2000}^{th}$ of a second to 2 seconds, or more. Similarly, when the exposure parameter is an f-number, the exposure parameter value may range from f/1-f/256, or more.

Further exemplary, the earlier and later images may be acquired using corresponding earlier and later exposure parameter values. The earlier and later exposure parameter values may be the same, or they may be different. Further exemplary, the earlier and later exposure parameter values may be predefined, for example for a predetermined number of images obtained immediately upon start up of the method 100.

Operation 104 describes the operation of estimating relative motion between the earlier and later images. In a particular embodiment, the relative motion is estimated based upon a change in position of a feature included within each of the earlier and later images. In an exemplary embodiment, the predefined feature is a portion of the image which corresponds to (i.e., is imaged/rendered by means of) a "reference" pixel located within a pixel sensor array of the imaging system, e.g., the reference pixel will exhibit a particular intensity/color value representative of the image at a corresponding location. For example, the reference pixel's movement/change of location from a first position in the sensor array corresponding to the feature's location within the earlier image to a second position in the sensor array corresponding to the feature's location within later image can be tracked to determine a "pixel trail," and the Euclidean distance of that pixel trail is computed to determine a motion vector length, as further described below. Further exemplary, the predefined feature may be an area of the image, said area corresponding to a reference group of pixels. For example, the predefined feature may be a predefined area of the image, the predefined area corresponding to a reference group/neighborhood of M×N pixels within the sensor array of the imaging system. In another embodiment, the predefined area is substantially the entire area of the sensor array.

Tracking of a reference pixel can be performed by determining which of the later image pixels has a color/intensity value which best matches the color/intensity value of the reference pixel. When the predefined feature comprises an area of the image, a reference group of pixels (two or more pixels) will be tracked. Further particularly, the search perimeter for locating the reference group's position can be restricted to a predefine area centered around the location of the reference group within the earlier image, based upon the expected range of motion between the earlier and later images.

The invention is not limited to the implementation of a particular motion estimation technique. Other motion estimation techniques may be applied to estimate motion between the earlier and later images in operation 104, and the estimated motion applied in operation 106 in accordance with the present invention.

Referring to the operation 106, an exposure parameter value is computed based upon the relative motion estimated between the earlier and later images. The computed exposure parameter may be the same value as one or both of the earlier and later exposure parameter values, or it may be different. For example, if substantially no motion is estimated between the earlier and later scene images, the computed exposure parameter value may be the same as the later exposure parameter value. Alternatively, if no/little motion is estimated between the earlier and later images, the computed exposure parameter may also differ from the later exposure parameter value, e.g., to further increase the exposure time allowed for subsequent images, so that fewer images will be needed to form the composite image, thereby increasing the image's SNR. In another embodiment, if an excessive amount of motion is estimated, the computed exposure parameter used for the new image may be decreased from the later image to provide for greater motion compensation. Exemplary embodiments of these operations are described in detail below.

In one embodiment of the invention, the exposure parameter value is computed based upon one motion estimation between an earlier and a later image. In another embodiment, the exposure parameter value is computed based upon multiple motion estimations, each motion estimation computed using a pair of earlier and later images, as will be further described below. In such an embodiment, the multiple motion estimations may be combined (e.g., a weighted or un-weighted average taken) to provide an equivalent motion estimation from which the exposure parameter is computed. Such an embodiment can be useful in providing historic trend as to the motion, and can be advantageously applied to new (or subsequently-acquired) images if that motion trend continues.

Further exemplary, operation 106 is made conditional upon the estimated motion not exceeding a predefined threshold, e.g., a maximum allowed motion. An exemplary embodiment of this conditional operation is further illustrated below.

Referring to operation 108, a third or "new" image of the scene is acquired using the computed exposure parameter, e.g., by applying a particular exposure duration to a camera acquiring the new image. As with the earlier and later images, the new image may be immediately consecutive with the later scene image, or it may be removed one or more images therefrom. At 110, the earlier, later and new images are composited to produce a motion-compensated composite image of the scene.

The collective number of images acquired to form the motion-compensated composite image according to the present invention may be any arbitrary number of three or more. In a particular embodiment of the invention, the collective number of images acquired to form the motion-compensated composite image may be 3, 4, 8, 16, 32, 64, 128, 171, 256, 512, 1024, 2048, 4096, or more.

Figure 2:
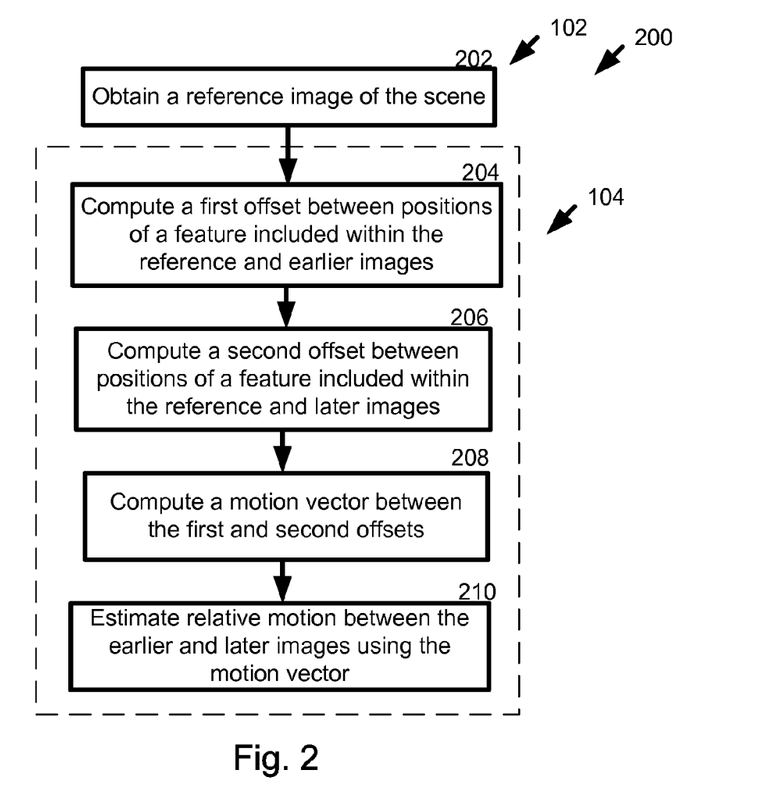
FIG. 2 illustrates an exemplary embodiment for estimating motion between two images in accordance with the method of FIG. 1.

FIG. 2 illustrates an exemplary embodiment of operations 102 and 104 in accordance with the method 100 of FIG. 1. Operation 202 represents an exemplary embodiment of operation 104, in which a reference image of the scene is obtained. Exemplary, when the earlier and later images are true first and second images, the reference image is defined as an earlier image. In another embodiment in which the earlier and later images correspond to other than the true first and second images, the reference image is a composite of at least one version of an earlier image and a later image, as will be further described below.

Operations 204-210 represent an exemplary embodiment of operation 104, whereby relative motion between the earlier and later images are estimated. At 204, a first offset is computed between the position of a predefined feature (e.g., a predefined pixel) included within the earlier image and a position of the predefined feature as it is located in the reference image. At 206, a second offset is computed between a position of the predefined feature included within the later image and a position of the predefined feature located in the reference image. At 208, a motion vector length is computed as the difference between the first and second offsets. At 210, the relative motion between the earlier and later images is computed as a function of the computed motion vector length. In the embodiment in which the predefined feature is a pixel, the motion vector length will correspond to an Euclidean distance over which the position of the predefined pixel shifts between the earlier and later images.

Exemplary, a comparison process may be used to determine the exposure parameter value in operation 106. In one embodiment in which the exposure parameter is an exposure duration and the predefined feature is a pixel, the relative movement of which results in a measured Euclidian distance "x," a comparison is made between quantity x to a predefined distance "y," the value y corresponding to the maximum Euclidean distance which the predefined pixel is permitted to move within the time period between acquisition of the earlier and later images. If the measured distance x is less than the maximum allowed distance y, the present exposure duration may be maintained, as the present rate of movement does not produce an unacceptable blurring effect. Alternatively, the exposure duration could be increased (e.g., relative to the exposure duration of the later image) in order to decrease the total number of images acquired to construct the motion compensated composite image, such a decrease resulting in a higher SNR for the composite image, as noted above. Still alternatively, another of the exposure parameters may be adjusted, for example the imaging device's f-number is decreased. The change in the exposure duration (f-number increment, etc.) may be a predefined amount for each instance in which such a condition arises, or it may vary as a function of the amount y exceeds x. The distance y is selected to provide the maximum acceptable level of motion between images, and it may be a fixed value for all acquired images, or it may vary over one or more of the acquired images.

Alternatively, if the measured distance x is greater than the maximum allowable distance y, the exposure duration is decreased (the f-number increased, etc.), as the predefined pixel has undergone excessive movement between acquisition of the earlier and later images. The change in the exposure duration (f-number increment, etc.) may be a predefined amount for each instance in which such a condition arises, or it may vary as a function of the amount x exceeds y. Further exemplary, the later image is excluded from compositing with other images, as it will contribute to a blurring effect within the scene.

Figure 3A:
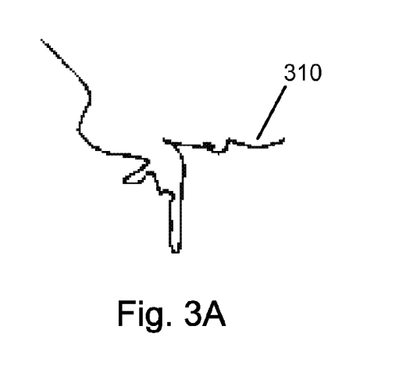
FIGS. 3A and 3B illustrate exemplary pixel trails generated in accordance with the present invention.
Figure 3B:
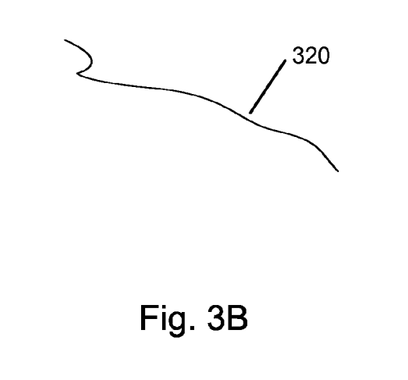

FIGS. 3A and 3B illustrate respective pixel trails 310 and 320 generated by two respective movements of a camera which is used to photograph the same image. The pixel trail 310 illustrated in FIG. 3A has a pixel trail count of 60 pixels, producing an associated image SNR of 25 dB. The pixel trail 320 illustrated in FIG. 3B has a pixel trail count of 27 pixels, and produces an associated image SNR of 22 dB. While the pixel trail count for pixel trail 310 is higher (60 pixels) than the pixel trail count of pixel trail 320 (27 pixels), it can be seen that pixel trail 310 reverses it direction several times, and thus does not have as long an effective length (e.g., a Euclidean distance) as pixel trail 320, which is generally uni-directional. As a result, pixel trail 320 produces an associated image SNR which is lower than that of the pixel trail 310.

Figure 4:
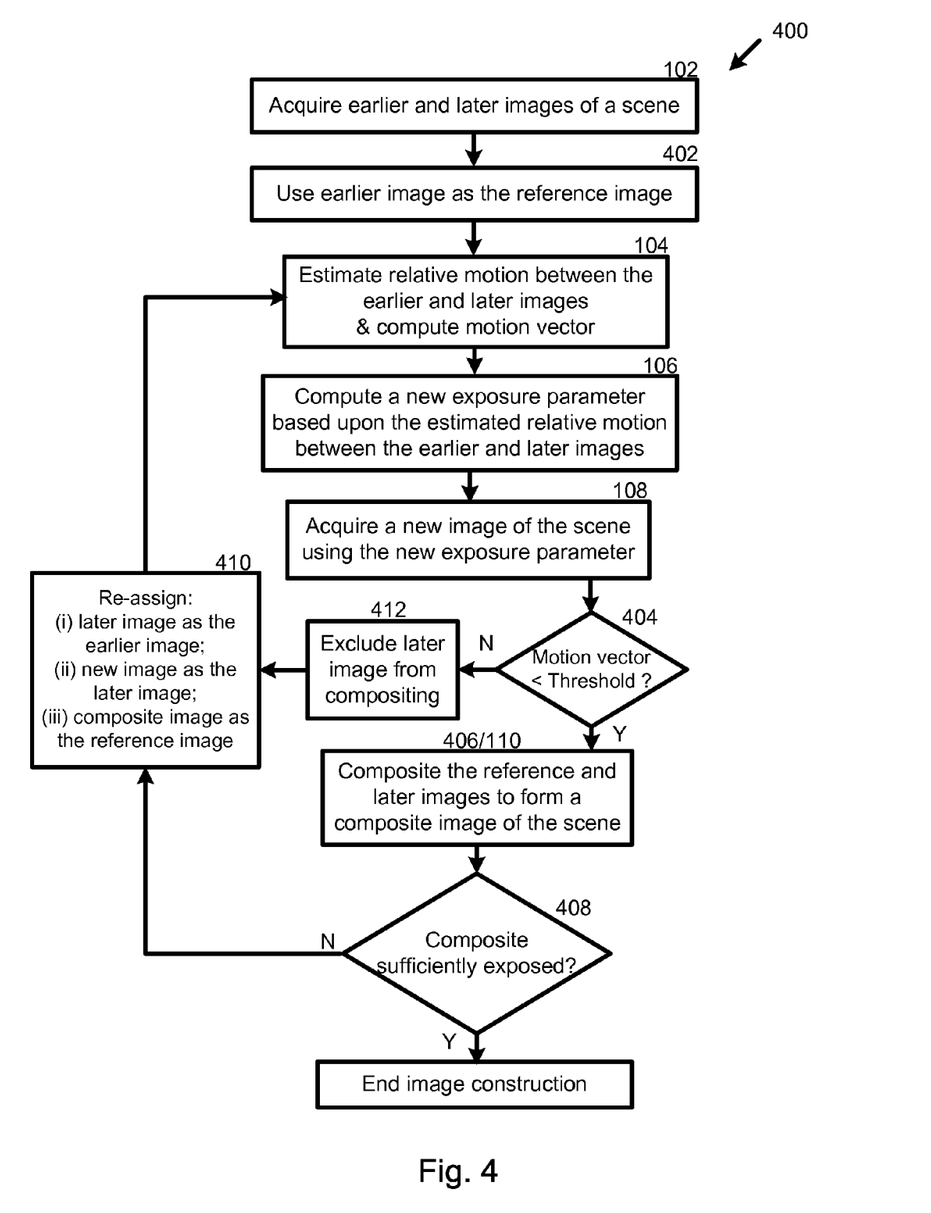
FIG. 4 illustrates a detailed exemplary embodiment for constructing a motion-compensated composite image of a scene in accordance with the method of FIG. 1.

FIG. 4 illustrates a detailed embodiment of method 100 shown in FIG. 1, with previously identified features retaining their reference indices. As noted above, the described earlier and later images refer to successively-occurring images of the scene, either immediately consecutive, or to images which have intervening images located therebetween. The images are referred to numerically in parenthesis to assist in the understanding of their sequencing, and are not meant to indicate the true/absolute image number.

Operation 102 is as described above, whereby the earlier (first) and later (second) images are acquired. Method 400 further includes operation 402, in which the earlier image is used as a reference image, as described above in FIG. 2. Operation 104 is also as described above in which relative motion occurring between the earlier and later images is estimated, and a corresponding motion vector length computed. Operation 104 implements a reference image for computing the motion vector length. As noted above, the reference image may be either the earlier image, for example when the earlier and later images are the true first and second images acquired. In another embodiment in which the earlier and later images are not the true first and second images acquired, the reference image is a composition of at least one earlier image and one later image, as will be further described below.

Operations of 106 and 108 are as described above, whereby an exposure parameter is computed based upon the motion vector length and a new (third) image of the scene is acquired using the computed exposure parameter. In an exemplary embodiment, the operation 106 may be influenced by how close to the maximum motion distance y the measured distance x comes. For example, if the measured motion distance x reaches within 10 percent of the maximum allowable motion distance y, the method may include providing a decreased exposure duration in 106 as opposed to a nominal exposure duration for x not exceeding y.

Further exemplary in 106, the exposure parameter value may be computed based upon the motion estimation between one pair of earlier and later images, or it may be computed based upon the multiple motion estimations. In the former, the exposure parameter value is computed based upon one motion estimate occurring between one set of earlier and later images. In an embodiment of the latter, the exposure parameter is computed based upon multiple motion estimates, each estimate for a set of earlier and later images. In the latter embodiment, the multiple motion estimations may be combined (e.g., a weighted or un-weighted average taken) to provide an equivalent motion estimation from which the exposure parameter is computed. Such an embodiment can be useful in providing historic trend as to the motion occurring between images, and can be advantageously applied to new (or subsequently-acquired) images if that motion trend continues.

The method 400 further includes operation 404 where it is determined whether the motion vector length is less than a predefined threshold, e.g., whether the measured motion distance x is less than a maximum allowable motion distance y. If so, the reference and later (second) images are combined to form a composite image of the scene (operation 406). For the first execution of operation 406, the earlier image serves as the reference image, and the composite image formed therefrom is referred to as an intermediate composite image. In a repetition of operation 406 (operation 110), the reference image will be made up of at least one earlier image and at least one later image, as described below.

From operation 406 the method continues at 408 where it is determined whether the composite image is sufficiently exposed. In one embodiment, a determination is made as to whether a predefined aggregate exposure time (collectively over all images) has elapsed. In another embodiment, the brightness of the composite image is checked to determine if it at least meets a minimum threshold. Further alternatively, the amount of signal and noise (photon noise, readout noise, etc) is estimated in composite image, and more images are acquired until a targeted SNR for the composite image is achieved.

If the composite image has not been sufficiently exposed at 408, the method continues at 410, where the composite image is re-assigned as the reference image for the next motion vector computation executed during repetition of operation 104. Implementation of the reference image in computing the motion vector is as described above in relation to FIG. 2. Further at 410, each of the later (second) and new (third) images are re-assigned an earlier image status, i.e., the later scene image is re-assigned as the earlier image, and the new image is re-assigned as the later image. The images' re-assignment to an earlier image status is to allow a new image acquired at 108 to function as the new image according to the illustrated operations.

Once the re-assignment of the scene images has occurred as described at 410, the operations repeat as shown, whereby the repetition of 104 involves estimating the relative motion between the assigned earlier (second) and later (third) scene images, with the composition of the previously-assigned (i.e. prior to operation 408) earlier (first) and later (second) images serving as the reference image. A motion vector is computed for the estimated motion between these images, and the repetition of 106 involves computing an exposure parameter based upon the estimated motion between the assigned earlier (second) and later (third) images. The repetition of 108 involves acquiring a new (fourth) image using the computed exposure parameter. The repetition of 404 involves comparing that motion vector to a predefined threshold. Assuming that the motion vector is below the predefined threshold at 404, repetition of operation 406 involves compositing the assigned reference and earlier images. In this instance, the repetition of 406 will result in the composition of an earlier (first), a later (second) image and a new (third) image, corresponding to operation 110 shown in FIG. 1. In particular, the assigned earlier image at the repetition of operation 404 will include an earlier (first) image and a later (second) image. The assigned later image was previously the new (third) image during the first pass of the method 400. Accordingly, the repetition of operation 404 on the second and subsequent passes will provide a composite scene image that includes earlier, later and new images, per operation 110 of FIG. 1.

If at 404, the computed motion vector does not meet the condition, e.g., the motion vector is greater than or equal to the predefined threshold, then the later (second) image is excluded from compositing with the reference image (operation 412), and operation 406/110 is skipped. The method returns to operation 410, where the excluded later image is re-assigned as the earlier image for the next iteration, the new image is re-assigned as the later image. In this manner, the excluded later image is retained as a subsequent earlier image and the relative motion between it and the re-assigned later (third) image is estimated at the next iteration of operation 104. The composite image, which remains unchanged as operation 406/110 was not executed in this sequence, remains the reference image for the next iteration of the method 400. Further exemplary, the new exposure parameter which is computed at the repetition of 106 is a reduced exposure time as compared to the exposure time computed for the excluded and re-assigned (second) earlier image.

In accordance with the foregoing, the number of images can be adjusted dynamically based upon the estimated motion between the earlier and later acquired images to balance motion compensation correction and image SNR. In particular, when little motion is estimated between the earlier and later images, a longer exposure time for at least the next (new) image can be permitted, resulting in the use fewer images to construct the composite image, and accordingly an increased SNR for at least the new image. If a large amount of motion is estimated between the earlier and later images which approaches the maximum allowable amount of motion, a relatively short exposure duration can be set for the new image, to improve motion compensation correction and reduce blurring artifacts within the new image. Furthermore, if the estimated motion exceeds the maximum allowable amount, the later image is rejected and excluded for compositing with the scene images, thus avoiding a reduction in the composite image's overall SNR by inclusion of a blurred image in the composite image. In this manner, the method provides techniques for dynamically adjusting the number of images acquired to provide as many images as required to compensate for the estimated motion. In this way, the required motion compensation correction is achieved while retaining the highest SNR for the composite image.

The skilled person will appreciate that various alternatives and extensions may be practiced under the present invention. For example, the scene upon which the method applies may be defined for a small portion/area of the available scene area retaining a sharp image therein, and areas outside of that scene portion allowed to blur, or are actively processed to render a blurred effect. This technique can be used to provide an effect of motion tracking of a particular area or object included therein. Further exemplary, the predefined feature upon which estimated motion is computed may be two or more features, for example, two or more pixels. The pixels may be distributed within the scene portion which is intended to rendered relatively motion free.

Figure 5:
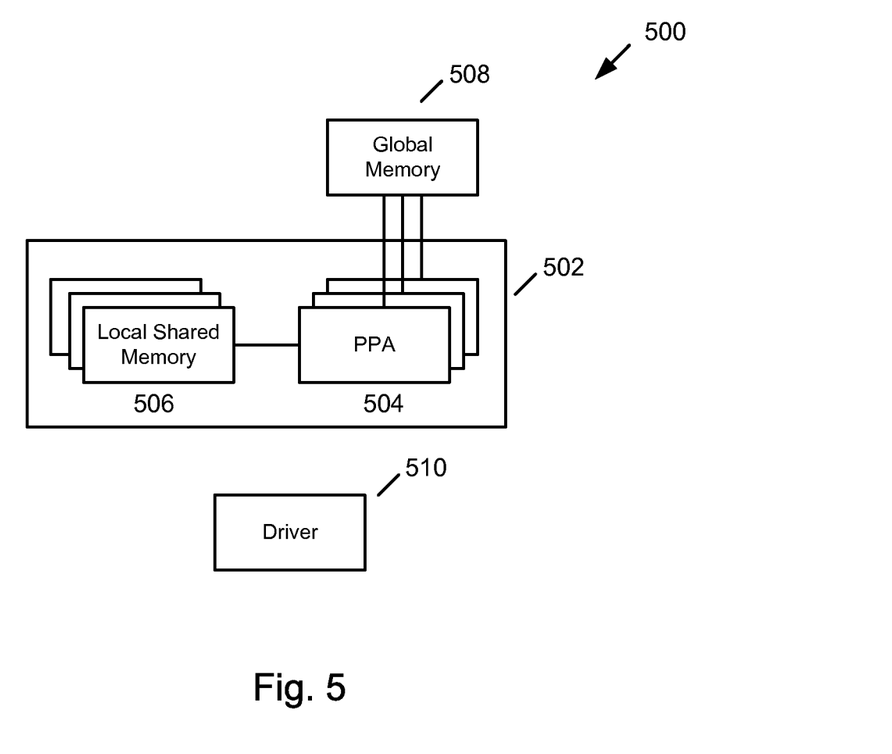
FIG. 5 illustrates an exemplary system operable to perform the operations illustrated in FIGS. 1, 2 and 4 in accordance with one embodiment of the present invention.

FIG. 5 illustrates an exemplary system 500 operable to perform the operations illustrated in FIGS. 1, 2 and 4 in accordance with the present invention. System 500 includes a processor 502, which includes a plurality of parallel processing architectures 504, each configured to operate on a predetermined number of threads. Accordingly, each parallel processing architecture 504 may operate in parallel, while the corresponding threads may also operate in parallel. In a particular embodiment, the parallel processing architecture 504 is a single instruction multiple data (SIMD) architecture of a predefined SIMD width or "warp," for example 32, 64, 128, 256, 512 or more threads.

The processor 502 may further include local shared memory 506, which may be physically or logically allocated to a corresponding parallel processing architecture 504. The system 500 may additionally include a global memory 508 which is accessible to each of the parallel processing architectures 504. The system 500 may further include one or more drivers 510 for controlling the operation of the processor 502 in accordance with the methods of FIGS. 1, 2 and 4. The driver(s) 510 may include one or more libraries for facilitating control of the processor 502. In one embodiment, the system 500 is included within in a graphics card. In another embodiment, the system 500 is included within the motherboard of an imaging system, e.g., a digital camera. The system 500 may be implemented in other components, for example, a computer or a game console, or in an embedded system, such as in a cellular telephone.

The system 500 includes means operable to perform any of the operations illustrated in FIGS. 1, 2 and 4 herein. In an embodiment exemplified by FIG. 1, the system 500 includes an imaging means for performing operations 102 and 108, and processor 502 for performing operations 104, 106 and 110. In the embodiment exemplified by FIG. 2, the system 500 includes an imaging means to perform operation 202 and processor 502 operable to perform operations 204-210. In the embodiment exemplified by FIG. 4, the system 500 includes imaging means for performing operations 102, 108, and 416, and processor 502 operable to perform 104, 106, 108, 402, 404/110, 406, 408, 412, and 414. The imaging means may be a light sensing/detection device, e.g., a CCD device or other types of photosensors/photodetectors. Further exemplary, the imaging system may include a lens and an exposure control mechanism for controlling the exposure parameters of the acquired image.

As readily appreciated by those skilled in the art, the described processes and operations may be implemented in hardware, software (a computer program element), firmware or a combination of these implementations as appropriate. In addition, some or all of the described processes and operations may be implemented as computer readable instruction code resident on a computer readable medium or product, the instruction code operable to control a computer of other such programmable device to carry out the intended functions. The computer readable medium on which the instruction code resides may take various forms, for example, a removable disk, volatile or non-volatile memory 908, etc.

The terms "a" or "an" are used to refer to one, or more than one feature described thereby. Furthermore, the term "coupled" or "connected" refers to features which are in communication with each other (electrically, mechanically, thermally, optically, as the case may be), either directly, or via one or more intervening structures or substances. The sequence of operations and actions referred to in method flowcharts are exemplary, and the operations and actions may be conducted in a different sequence, as well as two or more of the operations and actions conducted concurrently. The described features are not limited only to their implementation in the exemplary embodiment described therefor, and the skilled person will appreciate that these features can be implemented in the other described embodiments of the invention as well. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for constructing a motion-compensated composite image of a scene, the method comprising:
   (i) acquiring a plurality of images of a scene over time, the plurality of images including an earlier image of the scene and a later image of the scene;
   (ii) estimating relative motion between the earlier and later images;
   (iii) computing an exposure parameter value based upon the relative motion estimated between the earlier and later images;
   (iv) acquiring a number of new images of the scene, wherein the number is determined based on the computed exposure parameter value; and
   (v) compositing the earlier, later and new images of the scene to produce a motion-compensated composite image of the scene.

2. The method of claim 1, wherein the exposure parameter value comprises an exposure duration.

3. The method of claim 1, wherein (ii) comprises computing an Euclidean distance between a location of a predefined feature within the earlier acquired image and a location of said predefined feature within the later acquired image.

4. The method of claim 1,
   wherein the exposure parameter value comprises an exposure duration,
   wherein the estimated motion does not exceed a predefined value, and
   wherein (iii) comprises increasing an exposure duration of the later image to compute the exposure duration of at least one of the new images.

5. The method of claim 1,
   wherein the exposure parameter value comprises an exposure duration,
   wherein the estimated motion does exceed a predefined value, and
   wherein (iii) comprises decreasing an exposure duration of the later image to compute the exposure duration of at least one of the new images.

6. The method of claim 1, wherein (v) comprises:
   compositing the earlier and later images to produce an intermediate composite image; and
   compositing the new images the intermediate composite image to produce the motion-compensated composite image of the scene.

7. A method for constructing a motion-compensated composite image of a scene, the method comprising:
   (i) acquiring a plurality of images of a scene over time, the plurality of images including an earlier image of the scene and a later image of the scene;
   (ii) estimating relative motion between the earlier and later images;

(iii) computing an exposure parameter value based upon the relative motion estimated between the earlier and later images;

(iv) acquiring, using the computed exposure parameter value, a new image of the scene; and (v) compositing the earlier and later images to produce an intermediate composite image;

(vi) re-assigning the later image as an earlier image of the scene;

(vii) re-assigning the new image as a later image of the scene;

(viii) repeating (ii), (iii) and (iv) for the re-assigned earlier and later images, wherein motion is estimated between the re-assigned earlier and later images; and (ix) compositing the new image with the intermediate composite image to produce a motion-compensated composite image of the scene.

8. The method of claim 7, wherein the estimated motion between the re-assigned earlier and later images does not exceed a predefined threshold, the method further comprising repeating (ii)-(iv) for the re-assigned earlier and later images,
wherein (ii) comprises estimating relative motion between the re-assigned earlier and later images;
wherein (iii) comprises computing an exposure parameter value based upon the relative motion estimated between the re-assigned earlier and later images;
wherein (iv) comprises acquiring, using the computed exposure parameter value, a new image of the scene; and
wherein (v) comprises compositing the re-assigned earlier and later images to produce the motion-compensated composite image of the scene.

9. The method of claim 7, wherein the estimated motion between the re-assigned earlier and later images exceeds a predefined threshold, the method further comprising:
excluding the re-assigned later image from composition with the reference image;
re-assigning the excluded later image as an earlier image of the scene;
re-assigning the new image as a later image of the scene; and
repeating (ii) for the re-assigned earlier and the updated later images, wherein motion is estimated between the re-assigned earlier and updated later images.

10. The method of claim 9, further comprising repeating (iii) to compute a new exposure parameter value based upon the relative motion estimated between the re-assigned earlier and later images, wherein the new exposure parameter comprises a reduced exposure duration compared to the exposure parameter corresponding to the re-assigned earlier image which is excluded from composition with the reference image.

11. The method of claim 10, wherein the estimated motion between the re-assigned earlier and updated later images does not exceed a predefined threshold, the method further comprising repeating (ii)-(iv) for the re-assigned earlier and updated later images,
wherein (ii) comprises estimating relative motion between the re-assigned earlier and updated later images;
wherein (iii) comprises computing an exposure parameter value based upon the relative motion estimated between the re-assigned earlier and updated later images;
wherein (iv) comprises acquiring, using the computed exposure parameter value, a new image of the scene; and
wherein (v) comprises compositing the re-assigned earlier and updated later images to produce the motion-compensated composite image of the scene.

12. The method of claim 1,
wherein (i) comprises obtaining a reference image of the scene, and
wherein (ii) comprises:
(a) computing a first offset between the position of a predefined feature located within the earlier acquired image and said predefined feature :located within the reference image;
(b) computing a second offset between said position of said predefined feature located within the later acquired image and a position of said predefined feature located within the reference image;
(c) computing a motion vector length comprising the difference between the first and second offsets; and
(d) using the computed motion vector length to estimate the relative motion between the earlier and later acquired images.

13. A computer program product, resident of a non-transitory computer readable medium, operable to store instructions for constructing a motion-compensated composite image of a scene, the computer program product comprising:
(i) instruction code for acquiring a plurality of images of a scene over time, the plurality of images including an earlier image of the scene and a later image of the scene;
(ii) instruction code for estimating relative motion between the earlier and later images;
(iii) instruction code for computing an exposure parameter value based upon the relative motion estimated between the earlier and later images;
(iv) instruction code for acquiring a number of new images of the scene, wherein the number is determined based on the computed exposure parameter value; and
(v) instruction code for compositing the earlier, later and new images of the scene to produce a motion-compensated composite image of the scene.

14. The computer program product of claim 13, wherein (ii) comprises instruction code for computing an Euclidean distance between a location of a predefined feature with the earlier acquired image and a location of said predefined feature within the later acquired image.

15. The computer program product of claim 13, wherein (v) comprises:
instruction code for compositing the earlier and later images to produce an intermediate composite image; and
instruction code for compositing at least one of the new images with the intermediate composite image to produce the motion-compensated composite image of the scene.

16. A computer program product, resident of a non-transitory computer readable medium, operable to store instructions for constructing a motion-compensated composite image of a scene, the computer program product comprising:
(i) instruction code for acquiring a plurality of images of a scene over time, the plurality of images including an earlier image of the scene and a later image of the scene;
(ii) instruction code for estimating relative motion between the earlier and later images;
(iii) instruction code for computing an exposure parameter value based upon the relative motion estimated between the earlier and later images;
(iv) instruction code for acquiring, using the computed exposure parameter value, a new image of the scene;
(v) instruction code for compositing the earlier and later images to produce an intermediate composite image;
(vi) instruction code for re-assigning the later image as an earlier image of the scene;

(vii) instruction code for re-assigning the new image as a later image of the scene;

(viii) instruction code for repeating (ii), (iii) and (iv) for the re-assigned earlier and later images, wherein motion is estimated between the re-assigned earlier and later images; and (ix) instruction code for compositing the image with the intermediate composite image to produce the motion-compensated composite image of the scene.

17. The computer program product of claim 16, wherein the estimated motion between the re-assigned earlier and later images does not exceed a predefined threshold, the method further comprising instruction code for repeating (ii)-(iv) for the re-assigned earlier and later images, wherein (ii) comprises instruction code for estimating relative motion between the re-assigned earlier and later images;

wherein (iii) comprises instruction code for computing an exposure parameter value based upon the relative motion estimated between the re-assigned earlier and later images;

wherein (iv) comprises instruction code for acquiring, using the computed exposure parameter value, a new image of the scene; and wherein (v) comprises instruction code for compositing the re-assigned earlier and later images to produce the motion-compensated composite image of the scene.

18. A system operable to construct a motion-compensated composite image of a scene, the processor comprising:

(i) imaging means for acquire a plurality of images of a scene over time, the plurality of images including an earlier image of the scene and a later image of the scene;

(ii) means for estimating relative motion between the earlier and later images;

(iii) means for computing an exposure parameter value based upon the relative motion estimated between the earlier and later images;

(iv) imaging means for acquiring a number of new images of the scene, wherein the number is determined based on the computed exposure parameter value; and (v) means for compositing the earlier, later and new images of the scene to produce a motion-compensated composite image of the scene.

19. The system of claim 18, wherein (ii) comprises means for computing an Euclidean distance between a location of a predefined pixel with the earlier acquired image and a location of said predefined pixel within the later acquired image.

20. The system of claim 18, wherein (v) means for compositing comprises:

means for compositing the earlier and later images to produce an intermediate composite image; and means for compositing at least one of the new images with the intermediate composite image to produce the motion-compensated composite image of the scene.

21. A system operable to construct a motion-compensated composite image of a scene, the processor comprising:

(i) imaging means for acquire a plurality of images of a scene over time, the plurality of images including an earlier image of the scene and a later image of the scene;

(ii) means for estimating relative motion between the earlier and later images;

(iii) means for computing an exposure parameter value based upon the relative motion estimated between the earlier and later images;

(iv) imaging means for acquiring, using the computed exposure parameter value, a new image of the scene; and (v) means for compositing the earlier and later images to produce an intermediate composite image;

(vi) means for re-assigning the later image as an earlier image of the scene;

(vii) means for re-assigning the new image as a later image of the scene (viii) wherein (ii) comprises means for estimating relative motion between the re-assigned earlier and later images;

(ix) wherein (iii) comprises means for computing an additional exposure parameter value based upon the relative motion estimated between the re-assigned earlier and later images;

(x) wherein (iv) comprises means for acquiring, using the computed additional exposure parameter value, an additional new image of the scene; and (xi) means for compositing the additional new image and the new image with the intermediate composite image to produce the motion-compensated composite image of the scene.

22. The system of claim 21, wherein the estimated motion between the re-assigned earlier and later images does not exceed a predefined threshold, wherein (ii) comprises means for estimating relative motion between the re-assigned earlier and later images;

wherein (iii) comprises means for computing an exposure parameter value based upon the relative motion estimated between the re-assigned earlier and later images;

wherein (iv) comprises imaging means for acquiring, using the computed exposure parameter value, a new image of the scene; and wherein (v) comprises means for composting there-assigned earlier and later images to produce the motion-compensated composite image of the scene.

* * * * *